United States Patent
Lengert et al.

(10) Patent No.: US 9,790,815 B2
(45) Date of Patent: Oct. 17, 2017

(54) METHOD FOR OPERATING A THERMODYNAMIC CYCLE, AND THERMODYNAMIC CYCLE

(75) Inventors: Jörg Lengert, Lonnerstadt-Ailsbach (DE); Martina Lengert, Lonnerstadt/Ailsbach (DE); Roland Lutz, Erlangen (DE)

(73) Assignee: Kalina Power Limited, Hawthorn (AU)

( * ) Notice: Subject to any disclaimer, the term of this patent is extended or adjusted under 35 U.S.C. 154(b) by 881 days.

(21) Appl. No.: 12/865,754

(22) PCT Filed: Dec. 3, 2008

(86) PCT No.: PCT/EP2008/066673
§ 371 (c)(1),
(2), (4) Date: Aug. 2, 2010

(87) PCT Pub. No.: WO2009/095127
PCT Pub. Date: Aug. 6, 2009

(65) Prior Publication Data
US 2010/0326131 A1  Dec. 30, 2010

(30) Foreign Application Priority Data

Feb. 1, 2008  (DE) .................. 10 2008 007 249
Sep. 2, 2008  (DE) .................. 10 2008 045 450

(51) Int. Cl.
F25B 43/00   (2006.01)
F01K 25/04   (2006.01)
(Continued)

(52) U.S. Cl.
CPC ............. F01K 25/065 (2013.01); Y02E 20/14 (2013.01)

(58) Field of Classification Search
CPC ........ F01K 25/04; F01K 25/02; F01K 25/065; F25B 43/00; F25B 11/02; Y02E 20/14; F01D 15/10; F02C 1/10
(Continued)

(56) References Cited

U.S. PATENT DOCUMENTS 2,617,265 A * 11/1952 Ruff ................................ 62/192
3,120,839 A *  2/1964 Glahe .................... F22B 35/101
                                                            122/406.5
(Continued)

FOREIGN PATENT DOCUMENTS

CN   1291679 A   4/2001   ............. F01K 25/00
CN   1993536 A   7/2007   ............. F01K 25/06
(Continued)

OTHER PUBLICATIONS

International PCT Search Report and Written Opinion, PCT/EP2008/066673, 12 pages, Mar. 14, 2011.
(Continued)

Primary Examiner — Frantz Jules
Assistant Examiner — Martha Tadesse
(74) Attorney, Agent, or Firm — Sunstone IP

(57) ABSTRACT

In a thermodynamic cycle with at least one first heat exchanger for creating a first heated or partially evaporated working medium flow by heating or partially evaporating a liquid working medium flow by heat transmission from an expanded working medium flow; a second heat exchanger for creating a second at least partially evaporated working medium flow; a separator for separating a liquid from a vaporous phase of the second flow; and an expansion device for creating an expanded vaporous phase, pressure pulsations are prevented during the start-up of the cycle in that the vaporous phase separated by the separator is conducted past the expansion device and the first heat exchanger. The liquid (Continued)

phase separated by the separator is cooled in the first heat exchanger by heat transfer to the liquid flow. After the first heat exchanger, the cooled, separated, liquid phase and the separated vaporous phase are brought together.

16 Claims, 1 Drawing Sheet

(51) Int. Cl.
*F01K 25/02* (2006.01)
*F25B 11/02* (2006.01)
*F01D 15/10* (2006.01)
*F02C 1/10* (2006.01)
*F25B 30/02* (2006.01)
*F01K 25/06* (2006.01)

(58) Field of Classification Search
USPC .................................. 62/512, 238.1, 238.6
See application file for complete search history.

(56) References Cited

U.S. PATENT DOCUMENTS

| | | | | |
|---|---|---|---|---|
| 3,161,232 A | * | 12/1964 | Bishop | 165/62 |
| 3,194,218 A | * | 7/1965 | Schroedter et al. | 122/406.5 |
| 3,472,207 A | * | 10/1969 | Foldes | F22B 29/12 |
| | | | | 122/406.5 |
| 4,120,158 A | * | 10/1978 | Sheinbaum | F01K 21/005 |
| | | | | 60/641.3 |
| 4,183,225 A | * | 1/1980 | Politte et al. | 62/114 |
| 4,484,446 A | * | 11/1984 | Goldsberry | F01K 13/02 |
| | | | | 60/647 |
| 4,573,321 A | * | 3/1986 | Knaebel | F01K 25/065 |
| | | | | 60/649 |
| 5,029,444 A | * | 7/1991 | Kalina | F01K 25/065 |
| | | | | 60/649 |
| 5,440,882 A | | 8/1995 | Kalina | 60/641.2 |
| 5,617,738 A | * | 4/1997 | Ikegami et al. | 62/509 |
| 5,839,282 A | * | 11/1998 | Bronicki et al. | 60/641.5 |
| 5,953,918 A | | 9/1999 | Kalina et al. | 60/653 |
| 5,988,267 A | * | 11/1999 | Park et al. | 165/110 |
| 6,820,421 B2 | * | 11/2004 | Kalina | 60/649 |
| 8,272,217 B2 | * | 9/2012 | Lengert | F01K 25/065 |
| | | | | 60/649 |
| 2004/0055302 A1 | | 3/2004 | Kalina | 60/649 |
| 2004/0182084 A1 | * | 9/2004 | Kalina | 60/698 |
| 2005/0022497 A1 | | 2/2005 | Takai et al. | 60/39.182 |
| 2005/0183418 A1 | * | 8/2005 | Kalina | F01K 25/065 |
| | | | | 60/517 |
| 2005/0235625 A1 | * | 10/2005 | Gericke et al. | 60/39.182 |
| 2006/0277911 A1 | | 12/2006 | Rhodes et al. | 60/670 |
| 2007/0022753 A1 | | 2/2007 | Lengert | 60/645 |
| 2007/0245733 A1 | * | 10/2007 | Pierson | F01K 25/08 |
| | | | | 60/651 |
| 2010/0205962 A1 | * | 8/2010 | Kalina | F01D 15/10 |
| | | | | 60/641.8 |
| 2010/0326131 A1 | | 12/2010 | Lengert et al. | 62/512 |
| 2011/0000205 A1 | * | 1/2011 | Hauer | F01K 25/065 |
| | | | | 60/511 |

FOREIGN PATENT DOCUMENTS

| | | | | |
|---|---|---|---|---|
| EP | 0652368 A1 | 5/1995 | | F03G 7/04 |
| EP | 1070830 | 1/2001 | | F01K 25/06 |
| EP | 1503047 A1 | 2/2005 | | F01K 23/16 |
| EP | 1613841 | 12/2006 | | F01K 25/06 |
| JP | 02293567 A | * | 12/1990 | |
| JP | 10205308 A | 8/1998 | | F01K 25/06 |
| RU | 2123606 C1 | 12/1998 | | F01K 23/04 |
| SU | 909238 A1 | 2/1982 | | F01K 25/00 |
| WO | WO 2005100755 A1 | * | 10/2005 | |
| WO | 2009/095127 A2 | 8/2009 | | |

OTHER PUBLICATIONS

Chinese Office Action, Application No. 200880128446.5, 18 pages, Apr. 1, 2013.
Canadian Office Action, Application No. 2713799, 3 pages, Dec. 23, 2014.
Indian Office Action, Application No. 2762/KOLNP/2010, 8 pages, Oct. 28, 2016.

* cited by examiner

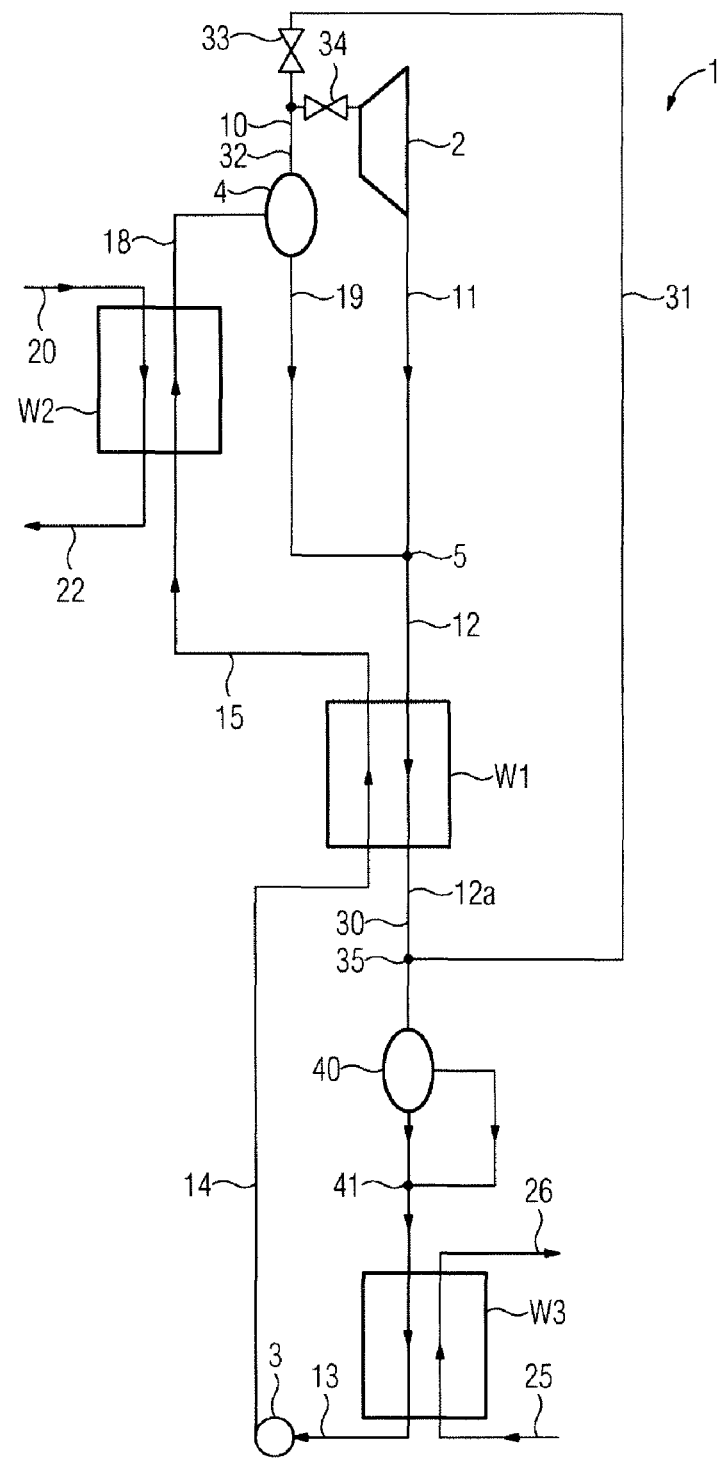

METHOD FOR OPERATING A THERMODYNAMIC CYCLE, AND THERMODYNAMIC CYCLE

CROSS-REFERENCE TO RELATED APPLICATIONS

This application is a U.S. National Stage Application of International Application No. PCT/EP2008/066673 filed Dec. 3, 2008, which designates the United States of America, and claims priority to DE Application No. 10 2008 007 249.4 filed Feb. 1, 2008 and DE Application No. 10 2008 045 450.8 filed Sep. 2, 2008. The contents of which are hereby incorporated by reference in their entirety.

TECHNICAL FIELD

The invention relates to a method for operating a thermodynamic circuit, and to a thermodynamic circuit

BACKGROUND

A circuit such as this is disclosed, for example, in EP 1 613 841 B1.

Thermal power stations use thermodynamic cycles to convert heat to mechanical and/or electrical energy. Conventional thermal power stations produce the heat by combustion of fuels, in particular the fossil energy sources coal, oil and gas. In this case, the cycles are operated, for example, on the basis of the classical Rankine cycle, with water as the working medium. However, the high boiling point of water makes water unattractive in particular when using heat sources at temperatures between 100 and 200° C., for example geothermal liquids or waste heat from combustion processes, because it is not economic.

In recent years, widely different technologies have been developed for heat sources with a temperature as low as this, which allow their heat to be converted to mechanical and/or electrical energy with high efficiency. In addition to the Rankine process with an organic working medium (organic Rankine cycle, ORC), the so-called Kalina cycle is, in particular, distinguished by considerably higher efficiencies than the classical Rankine process.

Various circuits have been developed for widely differing applications based on the Kalina cycle. These circuits use a two-substance mixture (for example ammonia and water) instead of water as the working medium, with the non-isothermal boiling and condensation process of the mixture is used to increase the efficiency of the circuit, in comparison to the Rankine circuit.

EP 1 613 841 B1 discloses a Kalina circuit of this type, which is particularly suitable for temperatures from 100 to 200° C., in particular from 100 to 140° C. EP 1 070 830 A1 discloses a further known circuit such as this.

It is already known from conventional water-steam circuits for the steam that is produced to first of all bypass the turbine, in order to start a circuit such as this, until a pressure has built up in the circuit which is sufficient to operate the turbine. However, if this principle is applied to a Kalina circuit mentioned above, then pressure pulsations can occur in the circuit during the starting of the circuit, which can become sufficiently great that an emergency shut-down of the circuit is required.

SUMMARY

According to various embodiments, a method for operating a circuit can be specified, in which such pulsations during starting can be prevented. According to other embodiments, a circuit, in particular for carrying out the above method, can be specified by means of which such pulsations can be prevented.

According to an embodiment, in a method for operating a thermodynamic circuit with at least the following components: —a first heat exchanger for producing a first heated or partially vaporized working medium flow by heating or partially vaporizing a liquid working medium flow by heat transfer from an expanded working medium flow; —a second heat exchanger for producing a second at least partially vaporized working medium flow by at least partially vaporizing or further vaporizing the first working medium flow with heat which is transferred from an external heat source; —a third heat exchanger for completely condensing the expanded working medium flow; —a separator for separating a liquid phase from a vapor phase of the second working medium flow; —an expansion device, in particular a turbine, for expanding the vapor phase, converting its energy to a usable form, and producing an expanded vapor phase; —a combination point for producing the expanded working medium flow by combining the liquid phase and the expanded vapor phase; in order to start the circuit, —the vapor phase which has been separated by the separator bypasses the expansion device and the first heat exchanger, —the liquid phase which has been separated by the separator is supplied via the combination point to the first heat exchanger, where it is cooled down by heat transfer to the liquid working medium flow, and—after the first heat exchanger, the cooled-down separated liquid phase and the separated vapor phase are combined to form a cooled-down working medium flow.

According to a further embodiment, a liquid phase and a vapor phase of the cooled-down working medium flow can be separated from one another, and are then combined again. According to a further embodiment, a multiple-substance mixture can be used as the working medium. According to a further embodiment, a two-substance mixture, in particular an ammonia-water mixture, can be used as the multiple-substance mixture. According to a further embodiment, a geothermal liquid, in particular thermal water, can be used as the external heat source. According to a further embodiment, the heat source can be at a temperature of 100° C. to 200° C., in particular from 100° C. to 140° C.

According to another embodiment, a thermodynamic circuit, in particular for carrying out the method as described above, may comprise at least—a first heat exchanger for producing a first heated or partially vaporized working medium flow by heating or partially vaporizing a liquid working medium flow by heat transfer from an expanded working medium flow; —a second heat exchanger for producing a second at least partially vaporized working medium flow by at least partially vaporizing or further vaporizing the first working medium flow with heat which is transferred from an external heat source; —a third heat exchanger for completely condensing the expanded working medium flow; —a separator for separating a liquid phase from a vapor phase of the second working medium flow; —an expansion device, in particular a turbine, for expanding the vapor phase, converting its energy to a usable form, and producing an expanded vapor phase; —a combination point for producing the expanded working medium flow by combining the liquid phase and the expanded vapor phase; and a bypass line for bypassing the expansion device and the first heat exchanger, which branches off from a line between the separator and the expansion device and opens into a line between the first heat exchanger and the third heat exchanger.

According to a further embodiment of the thermodynamic circuit, a further separator for separating a liquid phase from a vapor phase, and a mixer for mixing the liquid and vapor phases which have been separated by the further separator, can be connected in the line between the first heat exchanger and the third heat exchanger between the opening of the bypass line and the third heat exchanger. According to a further embodiment of the thermodynamic circuit, the working medium may consist of a multiple-substance mixture. According to a further embodiment of the thermodynamic circuit, the multiple-substance mixture may be a two-substance mixture, in particular an ammonia-water mixture. According to a further embodiment of the thermodynamic circuit, the thermodynamic circuit may have a geothermal liquid, in particular thermal water, as the external heat source. According to a further embodiment of the thermodynamic circuit, the external heat source can be at a temperature of 100° C. to 200° C., in particular from 100° C. to 140° C.

BRIEF DESCRIPTION OF THE DRAWINGS

The invention as well as further advantageous refinements will be explained in more detail in the following text with reference to one exemplary embodiment in the FIGURE.

FIG. 1 shows a thermodynamic circuit according to various embodiments, illustrated in a simplified, schematic form.

DETAILED DESCRIPTION

According to various embodiments, during starting, a very large amount of energy is supplied to the first heat exchanger when the liquid phase, which has been separated by the separator, and the vapor phase are combined before the first heat exchanger. This means that all of the energy in these flows is passed into the first heat exchanger, thus resulting in a high degree of vaporization of the liquid working medium as a result of the heat transfer on the primary side of the heat exchanger. This results in major changes in the pressure ratios between the inlet to the first heat exchanger and the outlet from the second heat exchanger, particularly when the pressure of the working medium is measured at the outlet from the second heat exchanger or behind the separator, and is used as a controlled variable for the circuit. Because of the changing pressure ratios and the control actions that they result in, vaporization processes can be caused which can also suddenly collapse again, thus producing pressure pulsations in the circuit.

If the separated vapor phase bypasses both the expansion device and the first heat exchanger, this prevents an excessive amount of heat being introduced into the first heat exchanger, and therefore an excessive amount of heat being transferred to the liquid working medium. This makes it possible to prevent excessive vaporization of the liquid working medium in the first heat exchanger, and thus reliably to suppress the pulsations.

In the case of the cooled-down working medium flow, a liquid phase and a vapor phase are advantageously separated from one another, and are then combined again. This allows the working medium to be homogenized before it is supplied to the third heat exchanger, thus improving the efficiency of the circuit.

The circuit according to various embodiments is distinguished by a bypass line which branches off from a line between the separator and the expansion device and opens after the first heat exchanger into a line between the first heat exchanger and the third heat exchanger. The advantages and considerations stated for the method according to various embodiments apply correspondingly to the circuit.

In order to homogenize the working medium before it is supplied to the third heat exchanger, and therefore to improve the efficiency of the circuit, a further separator for separating a liquid phase from a vapor phase, and a mixer for mixing the liquid and vapor phases which have been separated by the further separator, are advantageously connected in the line between the first heat exchanger and the third heat exchanger between the opening of the bypass line and the third heat exchanger.

According to an embodiment, a multiple-substance mixture is used as the working medium. The multiple-substance mixture is preferably a two-substance mixture, in particular an ammonia-water mixture. A particularly high circuit efficiency can be achieved by the non-isothermal vaporization and condensation of a mixture such as this.

Energy can be obtained in a particularly environmentally friendly manner by the use of a geothermal liquid, in particular thermal water, from a geothermal source as a heat source. However, exhaust gases (flue gases) from gas and/or steam turbine installations, or the heat produced in industrial production processes (for example during steel production) can also be used as a heat source.

In this case, a high circuit efficiency can also be achieved if the heat source is at a temperature from 100° C. to 200° C., in particular 100° C. to 140° C.

A thermodynamic circuit 1, as illustrated in the FIGURE, comprises a first heat exchanger (preheater) W1, a second heat exchanger (vaporizer) W2 and a third heat exchanger (condenser) W3.

The second heat exchanger W2 makes thermal contact on the primary side with an external heat source, and in the illustrated exemplary embodiment hot thermal water 20 from a geothermal source, which is not illustrated in any more detail, flows through its primary side, and its secondary side is connected on the one hand to the first heat exchanger W1 and on the other hand to a separator 4. The separator 4 is used to separate a vapor phase from a liquid phase of a partially vaporized working medium. A vapor-side outlet of the separator 4 is connected to a turbine 2, as an expansion device. The output side of the turbine 2 is connected to a combination point in the form of a mixer 5. The mixer 5 is additionally connected to a liquid output of the separator 4. On the output side, the mixer 5 is connected to the secondary side of the first heat exchanger W1. This is in turn connected on the secondary side via a line 30 to the primary side of the third heat exchanger (condenser) W3, through whose secondary side cooling water 25 flows.

A bypass line 31 is used for the vapor phase, which has been separated in the separator 4, to bypass the turbine 2 and the first heat exchanger W1. The bypass line 31 branches off from a line 32 between the separator 4 and the turbine 2, and opens after the first heat exchanger W1 into the line 30 between the first heat exchanger W1 and the third heat exchanger W3. Valves 3, 34 are used to control and/or regulate the supply of vapor phase 10 into the bypass line 31 or into the turbine 2.

A further separator 40 for separating a liquid phase from a vapor phase, and a further mixer 41 for mixing the liquid phase which has been separated by the separator 40 with the separated vapor phase, are connected in the line 30 between the first heat exchanger W1 and the third heat exchanger W3, between the opening 35 of the bypass line 31 and the third heat exchanger W3.

The third heat exchanger (condenser) W3 is connected by its outlet on the primary side, possibly via a condensate tank which is not illustrated in any more detail, via a pump 3 to the primary side of the first heat exchanger W1. The primary side of the first heat exchanger W1 is in turn connected to the secondary side of the second heat exchanger W2, which has already been mentioned.

A two-substance mixture, comprising water and ammonia, is used as the working medium in the circuit 1, and therefore exhibits non-isothermal vaporization and condensation.

During normal operation of the circuit 1, the working medium after the third heat exchanger (condenser) W3 is in a liquid state as a liquid working medium flow 13. The pump 3 is used to pump the liquid working medium flow 13 to an increased pressure by producing a pressurized, liquid working medium flow 14. In this case, of course, it is also possible to first of all supply the liquid working medium flow 13 after the third heat exchanger (condenser) W3 to a condensate tank, where it is temporarily stored, and from where it is taken and raised to an increased pressure by means of the pump 3.

The pressurized, liquid working medium flow 14 is supplied to the primary side of the first heat exchanger W1, and is heated by partial condensation of an expanded working medium flow 12, which has been passed through the secondary side of the first heat exchanger W1, and has even been partially vaporized, thus resulting, on the primary side after the first heat exchanger W1, in a first partially vaporized working medium flow 15 and, on the secondary side, a partially condensed, expanded working medium flow 12a. The steam component in the first partially vaporized working medium flow 15 is, for example, 15%.

The first partially vaporized working medium flow 15 is then supplied to the secondary side of the second heat exchanger W2.

The hot thermal water 20 leaving the second heat exchanger W2 as cooled-down thermal water 22 flows through the primary side of the second heat exchanger W2. In the second heat exchanger W2, the first partially vaporized working medium flow 15 is vaporized by heat transfer from the hot thermal water 20, therefore cooling the thermal water 20 down even further, and producing a second at least partially vaporized working medium flow 18. The second partially vaporized working medium flow 18 is supplied to the separator 4, in which the vapor phase 10 is separated from the liquid phase 19. The vapor phase 10 is then expanded in the turbine 2, and its energy is converted to a usable form, for example to electricity via a generator that is not illustrated, with an expanded vapor phase 11 being produced. For this purpose, the valve 34 is opened, and the valve 33 is closed.

The expanded vapor phase 11 and the liquid phase 19 which has been separated in the separator 4 are combined again in the mixer 5, forming an expanded working medium flow 12.

The expanded working medium flow 12 is partially condensed in the first heat exchanger W1, and the partially condensed, expanded working medium flow 12a is produced. The partially condensed, expanded working medium flow 12a is then condensed in the third heat exchanger (condenser) W3 with the aid of the (running) cooling water flow 25 producing the liquid working medium flow 13. The heat which is transferred to the cooling water flow 25 by the condensation of the expanded working medium flow 12a is dissipated through the cooling water flow 26 as it runs out.

In a modification of the circuit 1, instead of partial vaporization of the working medium at this stage, it is also possible only for the working medium to be heated on the primary side, in the first heat exchanger W1. The at least partial vaporization of the working medium can then be carried out completely in the second heat exchanger W2.

In a further modification of the circuit 1, an additional, fourth heat exchanger can be connected in the circuit 1 between the first heat exchanger W1 and the second heat exchanger W2, in order to transfer heat from the liquid phase 19, which has been separated in the separator 4, to the heated or already partially vaporized second working medium flow 15, before it is supplied to the second heat exchanger W2.

In order to start the circuit, the supply of vapor phase 10 to the turbine 2 is first of all suppressed by closing the valve 34. Instead of this, the valve 33 is opened, and the vapor phase 10, which has been separated by the separator 4, bypasses the turbine 2 and the first heat exchanger W1 through the bypass line 31. The liquid phase, which has been separated by the separator 4, is supplied—as during normal operation of the circuit 1 as well—via the mixer 5 to the first heat exchanger W1, where it is cooled down by heat transfer to the liquid working medium flow 14. After the first heat exchanger W1, the cooled-down separated liquid phase and the separated vapor phase 10 are combined to form a cooled-down working medium flow.

Before the combined phases are supplied to the third heat exchanger W3, a liquid phase and a vapor phase of the cooled-down working medium flow are separated from one another, and are then combined again via the mixer 41, in order to homogenize the cooled-down working medium flow in the separator 40.

Because the vapor phase bypasses the first heat exchanger W1 during starting of the circuit, this prevents excessive heat transfer to the liquid working medium flow on the primary side of the first heat exchanger W1, and therefore excessive vaporization, leading to pressure pulsations in the circuit, of the liquid working medium flow 14 in the first heat exchanger W1.

The invention has been described above with reference to exemplary embodiments, but in general should not be considered to be restricted to these exemplary embodiments. In fact, there are a multiplicity of possible variations and modifications of the invention, and of these exemplary embodiments. For example, valves can additionally be connected in the circuit.

What is claimed is:
1. A method for operating a thermodynamic circuit with at least the following components:
   a first heat exchanger for producing a first heated or partially vaporized working medium flow by heating or partially vaporizing a pressurized liquid working medium flow received directly from a pump by heat transfer from an expanded working medium flow;
   a second heat exchanger for producing a second at least partially vaporized working medium flow by at least partially vaporizing or further vaporizing the first working medium flow with heat which is transferred from an external heat source;
   a third heat exchanger for completely condensing the expanded working medium flow;
   a first separator for separating a liquid phase from a vapor phase of the second working medium flow;

an expansion device for expanding the vapor phase, converting its energy to a usable form, and producing an expanded vapor phase;

a first combination point for producing the expanded working medium flow by combining the liquid phase and the expanded vapor phase;

a working medium flow homogenizing system arranged between the first heat exchanger and the third heat exchanger, the working medium flow homogenizing system comprising:
   a second separator configured to separate a liquid phase from a vapor phase of the working medium flow, wherein all of the liquid phase from the second separator enters the third heat exchanger; and
   a mixer for combining the separated liquid phase and vapor phase output by the second separator in a manner that homogenizes the working medium flow;

the method comprising:
   in order to start the circuit:
      separating the vapor phase by the first separator, wherein the vapor phase bypasses the expansion device and the first heat exchanger,
      supplying the liquid phase, which has been separated by the first separator, via the first combination point to the first heat exchanger, where the liquid phase is cooled down by heat transfer to the pressurized liquid working medium flow received directly from the pump, and
      after the first heat exchanger, combining the cooled-down separated liquid phase and the separated vapor phase at a second combination point downstream of the first heat exchanger and upstream of working medium flow homogenizing system that is arranged upstream of the third heat exchanger to form a partially-condensed cooled-down working medium flow, such that the working medium flow homogenizing system homogenizes the combined liquid phase and vapor phase of the partially-condensed cooled-down working medium flow, and such that between the first separator and the second combination point, the separated liquid phase passes through the first heat exchanger and the separated vapor phase bypasses both the expansion device and the first heat exchanger; and
      supplying the partially-condensed cooled-down working medium flow produced by the working medium flow homogenizing system to the third heat exchanger for completely condensing the working medium flow, and delivering the completely condensed working medium flow to the pump; and
   after the circuit has been fully started up, directing the vapor phase to both the first heat exchanger and the expansion device for regular operation without the bypass.

2. The method according to claim 1, wherein a two-substance mixture is used as the working medium.

3. The method according to claim 1, wherein a geothermal liquid is used as the external heat source.

4. The method according to claim 1, wherein the heat source is at a temperature of 100° C. to 200° C. or at a temperature of 100° C. to 140° C.

5. A thermodynamic circuit comprising:
   a first heat exchanger for producing a first heated or partially vaporized working medium flow by heating or partially vaporizing a pressurized liquid working medium flow received directly from a pump by heat transfer from an expanded working medium flow;
   a second heat exchanger for producing a second at least partially vaporized working medium flow by at least partially vaporizing or further vaporizing the first working medium flow with heat which is transferred from an external heat source;
   a third heat exchanger for completely condensing the expanded working medium flow, wherein the completely condensed working medium flow is delivered to the pump;
   a first separator for separating a liquid phase from a vapor phase of the second working medium flow;
   an expansion device for expanding the vapor phase, converting its energy to a usable form, and producing an expanded vapor phase;
   a first combination point for producing the expanded working medium flow by combining the liquid phase and the expanded vapor phase;
   a working medium flow homogenizing system arranged between the first heat exchanger and the third heat exchanger, the working medium flow homogenizing system comprising:
      an additional separator configured to separate a liquid phase from a vapor phase of the working medium flow, wherein all of the liquid phase from the additional separator enters the third heat exchanger; and
      a mixer for combining the separated liquid phase and vapor phase output by the additional separator in a manner that homogenizes the working medium flow; and
   a valve system configured to be switched between:
      a first configuration in which the separated liquid phase is routed to bypass the expansion device and pass through the first heat exchanger and the separated vapor phase is routed through the expansion device;
      a second configuration in which the separated liquid phase is passed through the first heat exchanger, and the separated vapor phase is routed through a bypass line which branches off from a line between the first separator and the expansion device at a branching point, bypasses the expansion device and the first heat exchanger, and opens into a line between the first heat exchanger and the third heat exchanger at a second combination point downstream of the first heat exchanger and upstream of working medium flow homogenizing system to combine with the separated liquid phase heated by the first heat exchanger and form a partially-condensed cooled-down working medium flow, such that downstream of the mixer, the working medium flow homogenizing system homogenizes the combined liquid phase and vapor phase of the partially-condensed cooled-down working medium flow; and
      a third configuration directing the vapor phase to both the first heat exchanger and the expansion device for regular operation without the bypass after the circuit has been fully started up.

6. The thermodynamic circuit according to claim 5, wherein the working medium consists of a multiple-substance mixture.

7. The thermodynamic circuit according to claim 6, wherein the multiple-substance mixture is a two-substance mixture.

8. The thermodynamic circuit according to claim 5, having a geothermal liquid as the external heat source.

9. The thermodynamic circuit according to claim 5, wherein the external heat source is at a temperature of 100° C. to 200° C. or at a temperature of 100° C. to 140° C.

10. The thermodynamic circuit according to claim 6, wherein the multiple-substance mixture is an ammonia-water mixture.

11. The thermodynamic circuit according to claim 5, having thermal water as the external heat source.

12. The method according to claim 1, wherein an ammonia-water mixture is used as the multiple-substance mixture.

13. The method according to claim 1, wherein thermal water is used as the external heat source.

14. A system for operating a thermodynamic circuit comprising:
   a first heat exchanger for producing a first heated or partially vaporized working medium flow by heating or partially vaporizing a pressurized liquid working medium flow received directly from a pump by heat transfer from an expanded working medium flow;
   a second heat exchanger for producing a second at least partially vaporized working medium flow by at least partially vaporizing or further vaporizing the first working medium flow with heat which is transferred from an external heat source;
   a third heat exchanger for completely condensing the expanded working medium flow, the completely condensed working medium flow being delivered to the pump;
   a first separator for separating a liquid phase from a vapor phase of the second working medium flow;
   an expansion device, in particular a turbine, for expanding the vapor phase, converting its energy to a usable form, and producing an expanded vapor phase;
   a first combination point for producing the expanded working medium flow by combining the liquid phase and the expanded vapor phase;
   a working medium flow homogenizing system arranged between the first heat exchanger and the third heat exchanger, the working medium flow homogenizing system comprising: an additional separator configured to separate a liquid phase from a vapor phase of the working medium flow, wherein all of the liquid phase from the additional separator enters the third heat exchanger; and
   a mixer for combining the separated liquid phase and vapor phase output by the additional separator in a manner that homogenizes the working medium flow;
   wherein the system is configured, in order to start the circuit:
      to separate the vapor phase by the first separator, wherein the vapor phase bypasses the expansion device and the first heat exchanger,
      to supply the liquid phase, which has been separated by the first separator, via the first combination point to the first heat exchanger, where the liquid phase is cooled down by heat transfer to the liquid working medium flow, and
      after the first heat exchanger, to combine the cooled-down separated liquid phase and the separated vapor phase at a second combination point downstream of the first heat exchanger and upstream of working medium flow homogenizing system that is arranged upstream of the third heat exchanger to form a partially-condensed cooled-down working medium flow, such that the working medium flow homogenizing system homogenizes the combined liquid phase and vapor phase of the partially-condensed cooled-down working medium flow, and such that between the first separator and the second combination point, the separated liquid phase passes through the first heat exchanger and the separated vapor phase bypasses both the expansion device and the first heat exchanger; and
   wherein the system is configured, after the circuit has been fully started up, to direct the vapor phase to both the first heat exchanger and the expansion device for regular operation without the bypass.

15. The system according to claim 14, wherein a multiple-sub stance mixture is used as the working medium.

16. The method according to claim 14, wherein the heat source is at a temperature of 100° C. to 200° C. or at a temperature of 100° C. to 140° C.

* * * * *